(12) United States Patent
Yasunori

(10) Patent No.: US 11,066,026 B2
(45) Date of Patent: Jul. 20, 2021

(54) POWER SUPPLY BOX HAVING A BYPASS

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Hiromichi Yasunori, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/611,107

(22) PCT Filed: May 8, 2018

(86) PCT No.: PCT/JP2018/017753
§ 371 (c)(1),
(2) Date: Nov. 5, 2019

(87) PCT Pub. No.: WO2018/212014
PCT Pub. Date: Nov. 22, 2018

(65) Prior Publication Data
US 2020/0156571 A1 May 21, 2020

(30) Foreign Application Priority Data
May 16, 2017 (JP) .............................. JP2017-097009

(51) Int. Cl.
*B60R 16/03* (2006.01)
*H02H 9/02* (2006.01)
(Continued)

(52) U.S. Cl.
CPC ............... *B60R 16/03* (2013.01); *H02H 9/02* (2013.01); *B60R 16/033* (2013.01); *H02H 3/025* (2013.01); *H02J 7/00* (2013.01)

(58) Field of Classification Search
CPC .................................. B60R 16/03; H02H 9/02
See application file for complete search history.

(56) References Cited

U.S. PATENT DOCUMENTS 3,881,128 A * 4/1975 Douglas ................. B60Q 9/001
315/83
5,066,919 A * 11/1991 Klassen ............... G01R 31/006
324/538

(Continued)

FOREIGN PATENT DOCUMENTS

JP 2011-178384 A 9/2011
JP 2012-130108 A 7/2012
(Continued)

OTHER PUBLICATIONS

International Search Report, Application No. PCT/JP2018/017753, dated Jun. 5, 2018. ISA/Japan Patent Office.

*Primary Examiner* — Rexford N Barnie
*Assistant Examiner* — Kalu Kelly Emeaba
(74) *Attorney, Agent, or Firm* — Honigman LLP

(57) ABSTRACT

A power supply box includes: a first terminal that is configured to be connected to a first power storage device that supplies power to a first load; a second terminal that is configured to be connected to an alternator and a second load; a normally-off switch that is configured to be connected between the first terminal and the second terminal; and a bypass that is configured to be connected in parallel with the switch between the first and second terminals. The bypass includes a diode that has a forward direction that is from the first terminal toward the second terminal, and a (Continued)

resistor that is connected in series with the diode between the first and second terminals.

4 Claims, 2 Drawing Sheets

(51) Int. Cl.
*H02H 3/02* (2006.01)
*H02J 7/00* (2006.01)
*B60R 16/033* (2006.01)

(56) References Cited

U.S. PATENT DOCUMENTS

| | | | | |
|---|---|---|---|---|
| 5,162,720 A * | 11/1992 | Lambert | ............... | H02J 7/0024 320/104 |
| 5,187,382 A * | 2/1993 | Kondo | ............... | G01R 31/007 307/10.1 |
| 5,408,842 A * | 4/1995 | Goto | ............... | B60H 1/00978 318/801 |
| 6,403,943 B2 * | 6/2002 | Wada | ............... | G06G 7/28 250/214 A |
| 9,105,421 B2 * | 8/2015 | Ibe | ............... | H03M 11/24 |
| 9,431,850 B2 * | 8/2016 | Imai | ............... | H02J 7/1423 |
| 2004/0227478 A1 * | 11/2004 | Terakawa | ............... | G05B 9/02 318/286 |
| 2008/0071448 A1 * | 3/2008 | Koski | ............... | F16H 59/105 701/51 |
| 2011/0260544 A1 | 10/2011 | Imai et al. | | |
| 2013/0249285 A1 * | 9/2013 | Rettig | ............... | H02P 1/04 307/10.6 |
| 2013/0264875 A1 * | 10/2013 | Kaminsky | ............... | H02J 2207/20 307/52 |
| 2016/0241060 A1 * | 8/2016 | Suzuki | ............... | B60L 53/66 |
| 2017/0063354 A1 * | 3/2017 | Chang | ............... | G06F 13/4072 |
| 2017/0179713 A1 * | 6/2017 | Bourns | ............... | H01M 2/202 |
| 2017/0225635 A1 * | 8/2017 | Obayashi | ............... | H02J 7/0063 |

FOREIGN PATENT DOCUMENTS

| | | |
|---|---|---|
| JP | 2013-023103 A | 2/2013 |
| JP | 2014-012465 A | 1/2014 |

* cited by examiner

POWER SUPPLY BOX HAVING A BYPASS

CROSS-REFERENCE TO RELATED APPLICATIONS

This application is the U.S. national stage of PCT/JP2018/017753 filed on May 8, 2018, which claims priority of Japanese Patent Application No. JP 2017-097009 filed on May 16, 2017, the contents of which are incorporated herein.

TECHNICAL FIELD

The present disclosure relates to a power supply box that electrically connects a power storage device to an in-vehicle load that can receive power from the power storage device.

BACKGROUND

JP 2012-130108A discloses a power source device that is provided with a fail-safe function against failure. Specifically, a lithium battery pack that includes a lithium battery is arranged between a generator and an electrical load and between the lead battery and an electrical load. The lithium battery pack includes a power supply line and a bypass power supply line connected in parallel to the power supply line. JP 2012-130108A describes a configuration in which the power supply line is provided with a normally-off semiconductor switch and the bypass power supply line is provided with a normally-closed relay.

For example, envision the case where so-called dark current, which is supplied to a load that needs to operate even when the alternator is not operating (e.g., an actuator for remotely unlocking the door of a parked vehicle) is supplied from the lithium battery via the normally-closed relay (that is, via the bypass power supply line). At this time, even if a failure occurs in the destination to which the dark current is supplied, it is desirable to avoid an excessive dark current from flowing thereto. Accordingly, it is conceivable to provide a fuse for an output terminal of the lithium battery pack.

However, an operating alternator supplies the lithium battery with a charging current, which can be output from the lithium battery pack as a load current to be supplied to another load. This load current is, even at the normal value thereof, larger than the usual acceptable value of dark current and thus will cause the above-described fuse to melt.

In consideration of both avoiding such an excessive dark current and supplying a large current, it is desirable that the power supply line and the bypass power supply line are not directly connected in parallel and are each provided with a fuse (such a configuration will be described later in a "comparative example").

However, with such a configuration, it is necessary to provide separate wiring for dark current and for load current. Also, if the relay disclosed in JP 2012-130108A is provided in bypass wiring, then control is needed for the opening and closing thereof.

Here, an object of the present disclosure is to provide a technique to both avoid an excessive dark current and supply a large current, and, with a simple configuration, electrically connect a power storage device and an in-vehicle load to which power can be supplied by the power storage device.

SUMMARY

A power supply box includes: a first terminal that is configured to be connected to a first power storage device that supplies power to a first in-vehicle load; a second terminal that is configured to be connected to an alternator and a second in-vehicle load; a normally-off switch that is configured to be connected between the first terminal and the second terminal; and a bypass that is configured to be connected in parallel with the switch between the first terminal and the second terminal. The bypass includes a diode that has a forward direction that is from the first terminal toward the second terminal, and a resistor that is connected in series with the diode between the first terminal and the second terminal.

Advantageous Effects

The power supply box both avoids an excessive dark current and supplies a large current, and, with a simple configuration, electrically connects a power storage device and an in-vehicle load to each other, the in-vehicle load being able to receive power from the power storage device.

DETAILED DESCRIPTION OF PREFERRED EMBODIMENTS

Comparative Example

The configuration and operation of a comparative example will be described first for the purpose of comparison with a description of the present embodiment that will be given later.

Figure 2:
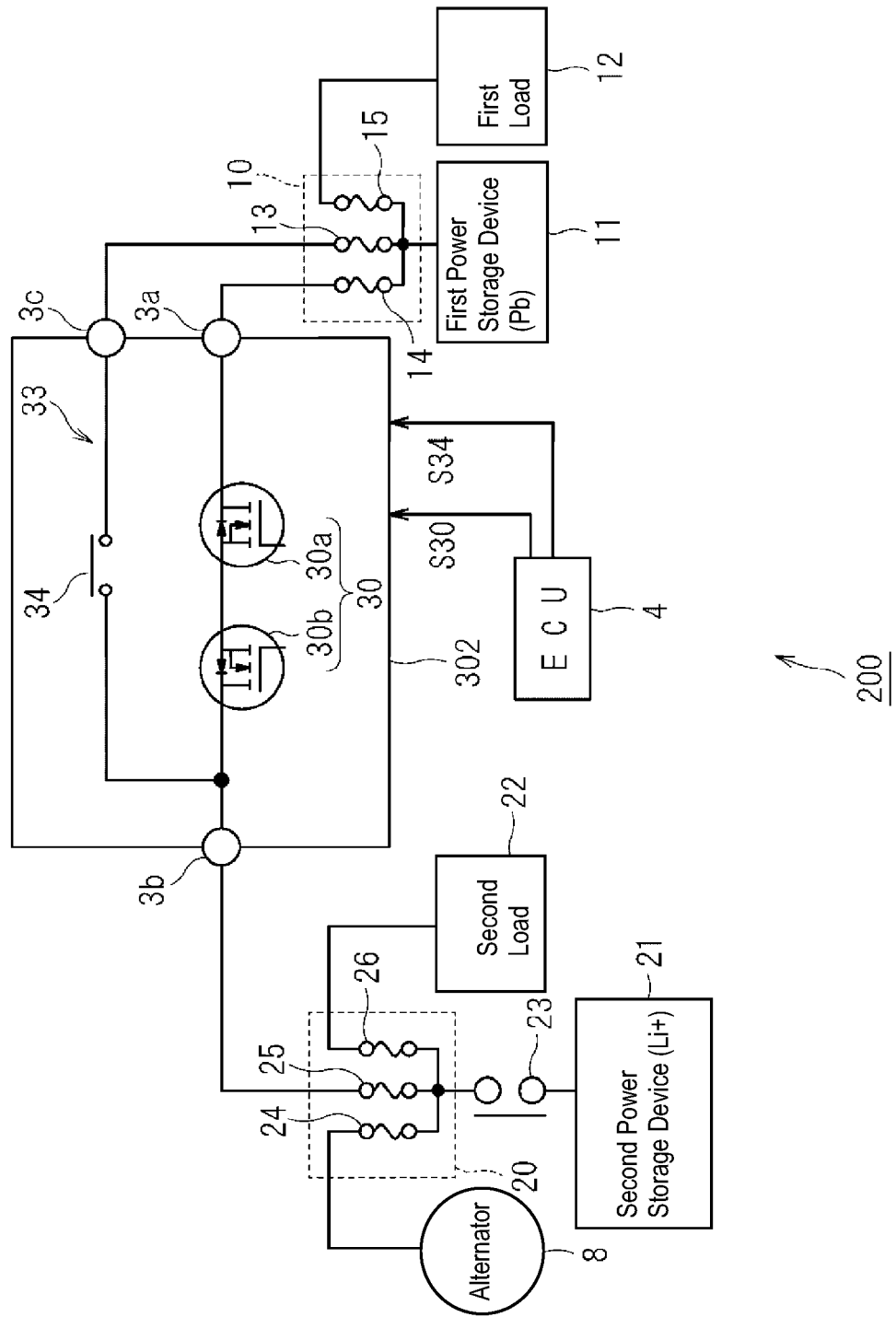
FIG. 2 is a block diagram illustrating a power source device that employs a power supply box according to a comparative example.

FIG. 2 is a block diagram illustrating a configuration of a power source device 200 that employs a power supply box 302 according to the comparative example.

The power supply box 302 includes a first terminal 3a, a second terminal 3b, and a third terminal 3c, and these terminals are connected to devices outside of the power supply box 302.

Specifically, the first terminal 3a is connected to a first power storage device 11 via a fuse 14, and the third terminal 3c is connected to the first power storage device 11 via a fuse 13. The first power storage device 11 supplies power to a first load 12, which is an in-vehicle load, via a fuse 15.

The second terminal 3b is connected to one end of a switch 23 via a fuse 25, an alternator 8 is connected to the one end of the switch 23 via a fuse 24, and a second load 22, which is an in-vehicle load, is connected to the one end of the switch 23 via a fuse 26. The other end of the switch 23 is connected to a second power storage device 21. The switch 23 may, for example, be turned on and serve as a charging path from the alternator 8 or the first power storage device 11 to the second power storage device 21, or as a power supply path from the second power storage device 21 to the second load 22.

It should be noted that dark current is supplied from the first power storage device 11 to both the first load 12 and the second load 22. Accordingly, the switch 23 switches off when the alternator 8 is not operating.

The following describes a case in which the fuses 13, 14, and 15 are provided in a battery fuse terminal 10, and the fuses 24, 25, and 26 are provided in a battery fuse terminal 20.

The first power storage device 11 may be a lead battery for example, and is indicated by "(Pb)" in the drawings. The second power storage device 21 may be a lithium ion battery for example, and is indicated by "(Li+)" in the drawings.

The power supply box 302 includes a switch 30 and a relay 34. The switch 30 is connected between the first terminal 3a and the second terminal 3b, and is normally-off. The switch 30 may be a semiconductor switch for example, and is constituted by field-effect transistors 30a and 30b that are connected in series and whose forward directions are opposite to each other. The transistors 30a and 30b are controlled to be conductive or non-conductive in co-ordination by a control signal S30 that is output from an ECU (electric control unit) 4.

The relay 34 is connected between the first terminal 3a and the third terminal 3c, and is normally-closed. The relay 34 may be an electromagnetic relay for example, and is opened or closed by a control signal S34 that is output by the ECU 4.

The opening and closing of the transistor 30a, the transistor 30b, and the relay 34 under the control of the ECU 4 is known, as in JP 2012-130108A for example, and a detailed description thereof will be omitted.

The following describes a case in which dark current is supplied from the first power storage device 11 to the second load 22 via the power supply box 302. The switch 30 is normally-off, and the relay 34 is normally-closed. Accordingly, the dark current does not flow through the fuse 14 that is connected in series to the switch 30 between the first power storage device 11 and the second load 22, and does flow through the fuse 13 that is connected in series to the relay 34 between the first power storage device 11 and the second load 22.

Normally, in a situation in which dark current is supplied, an electronic circuit that detects dark current having become excessive is not operating. The reason for this is to suppress the consumption of current. Accordingly, it is preferable to use a method other than information processing to avoid dark current becoming excessive.

Accordingly, it is sufficient that the rating of the fuse 13 is set to a value at which the flow of dark current is cut when dark current that flows from the first power storage device 11 to the second load 22 via the power supply box 302 becomes excessive.

When the alternator 8 operates, charging current is supplied to the first power storage device 11 through the fuses 24 and 25, the switch 30 that is switched on, and the fuse 14. At this time, the relay 34 opens and the charging current is prevented from flowing to the fuse 13. Accordingly, it is sufficient that the rating of the fuse 14 is set to a value at which the flow of charging current is cut when the charging current becomes excessive.

In this way, the normally-closed relay 34 allows dark current to flow from the third terminal 3c to the second terminal 3b, while the normally-off switch 30 does not allow dark current to flow from the first terminal 3a to the second terminal 3b. On the other hand, charging current is prevented from flowing from the second terminal 3b to the third terminal 3c by the opened relay 34, and is allowed to flow from the second terminal 3b to the first terminal 3a by the switch 30 that is switched on. Thus, both excessive dark current is avoided and a large current is supplied due to the fuses 13 and 14 being provided independently from each other.

However, as is clearly described above, the relay 34 needs to be controlled in order to obtain such an effect. If the relay 34 is always closed, then even if the rating of the fuse 13 is set to a value at which the flow of excessive dark current is cut, the fuse 13 will melt due to charging current flowing therethrough, and consequently there will be no path for dark current. If the relay 34 is always open, then the fuse 14 has a rating that is big enough to fulfill the function of allowing charging current to flow therethrough, and the flow of excessive dark current cannot be cut.

Moreover, wiring that connects the third terminal 3c and the first power storage device 11 via the fuse 13, wiring that connects the first terminal 3a and the first power storage device 11 via the fuse 14, and the two fuses 13 and 14 become necessary.

In view of this, the following describes a technique to both cut the flow of excessive dark current and supply a large current with a simple configuration.

Embodiment

Figure 1:
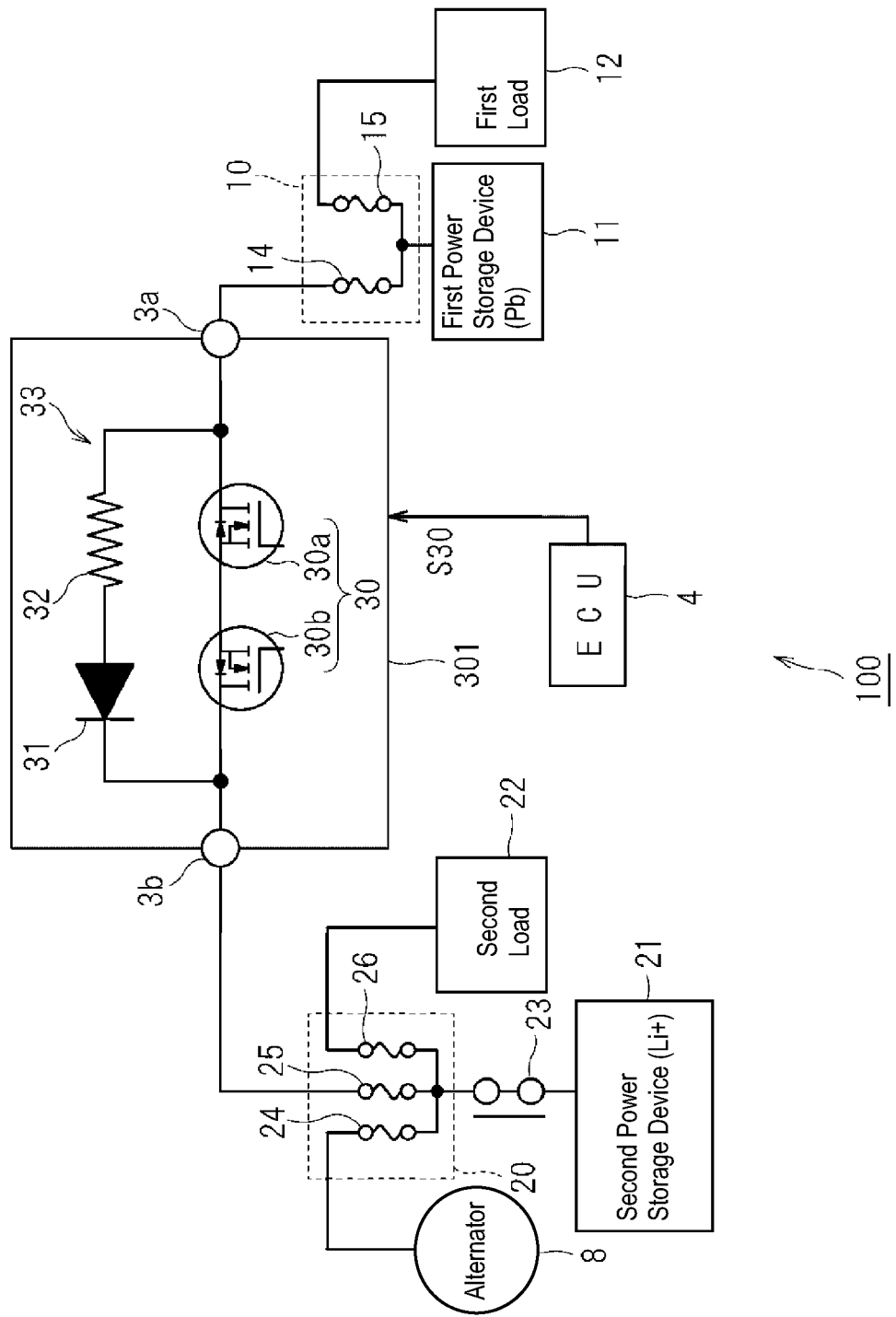
FIG. 1 is a block diagram illustrating a power source device that employs a power supply box according to an embodiment.

FIG. 1 is a block diagram illustrating a configuration of a power source device 100 that employs a power supply box 301 according to the present embodiment. Note that in the description of the present embodiment, the same reference numerals are used for constituent elements similar to those described in the comparative example, and descriptions thereof will be omitted as long as there is no variation.

In addition to the power supply box 301, the power source device 100 may also include the first power storage device 11. Alternatively, the power source device 100 may also include the second power storage device 21.

The power supply box 301 electrically connects the first power storage device 11 and the second load 22 that can receive power from the first power storage device 11. The following is a detailed description.

The power supply box 301 includes the first terminal 3a and the second terminal 3b. Unlike the power supply box 302, the power supply box 301 does not need the third terminal 3c.

The first terminal 3a is connected to the first power storage device 11. The first power storage device 11 supplies power to the first load 12. For example, the fuse 14 is provided between the first terminal 3a and the first power storage device 11, and the fuse 15 is provided between the first load 12 and the first power storage device 11. The fuses 14 and 15 may be provided in the battery fuse terminal 10 for example.

The second terminal 3b is connected to the alternator 8 and the second load 22. For example, the second terminal 3b may be connected to one end of the switch 23 via the fuse 25, the alternator 8 may be connected to the one end of the switch 23 via the fuse 24, and the second load 22 may be connected to the one end of the switch 23 via the fuse 26. The other end of the switch 23 is connected to the second power storage device 21. Thus, in FIG. 1, the second terminal 3b is connected to the alternator 8 via the fuses 24 and 25 that are connected in series, and the second terminal 3b is connected to the second load 22 via the fuses 25 and 26 that are connected in series.

The power supply box 301 further includes the switch 30 and a bypass 33. The configuration and operation of the switch 30 are similar to that in the comparative example. The bypass 33 is connected in parallel to the switch 30.

The bypass 33 includes a diode 31 and a resistor 32. The forward direction of the diode 31 is the direction from the first terminal 3a toward the second terminal 3b. That is, the diode 31 includes an anode on the first terminal 3a side thereof and a cathode on the second terminal 3b side thereof. The resistor 32 is connected in series to the diode 31 between the first terminal 3a and the second terminal 3b. FIG. 2 illustrates a case in which the resistor 32 is connected between the anode of the diode 31 and the first terminal 3a. The resistor 32 may also be connected between the cathode of the diode 31 and the second terminal 3b.

With the power supply box 301, even if the alternator 8 is not operating and the switch 30 is switched off, dark current is supplied from the first power storage device 11 to the second load 22 through the bypass 33. The dark current causes voltage drop in the resistor 32, and therefore the dark current does not become excessive.

By switching the switch 30 on when the alternator 8 is operating, a large current, specifically charging current, can be supplied from the alternator 8 to the first power storage device 11.

When the alternator 8 is not operating, otherwise known as idling stop, the switch 30 is switched on and power can be supplied from the first power storage device 11 to the second load 22. At this time, a current larger than dark current is usually supplied to the second load 22. The resistor 32 is present in the bypass 33, and the current flows through the switch 30 that has smaller impedance.

In this way, when the switch 30 is switched off, dark current flows from the first terminal 3a to the second terminal 3b through the bypass 33. In contrast, when the switch 30 is switched on, a large current flows bidirectionally between the first terminal 3a and the second terminal 3b through the switch 30. The large current is prevented from flowing from the second terminal 3b toward the first terminal 3a by the function of the diode 31. The large current is prevented from flowing from the first terminal 3a toward the second terminal 3b by the presence of the resistor 32, which has higher impedance than the switch 30 when the switch 30 is switched on (more specifically, for example, a larger resistance value than the on-resistance-value of the switch 30).

In this way, the power supply box 301 does not need the third terminal 3c, and, compared to the power supply box 302, it is possible to reduce the number of fuses and the amount of wiring between the power supply box 301 and the first power storage device 11. Due to the presence of the resistor 32, there is no need to provide fuses that are rated for dark current, other than the fuse 14. Also, the power supply box 301 does not need a relay to be provided in the bypass 33. Accordingly, the ECU 4 outputs the control signal S30 for controlling the switch 30 but does not need to output the control signal S34, which is necessary in the comparative example.

As described above, the power supply box 301 according to the present embodiment has a simple configuration with which both excessive dark current is avoided and a large current is supplied.

Working Example

Next, specific values that are preferable as resistance values of the resistor 32 will be described. It is desirable that a voltage of 10 V or more is applied to a load that is normally driven with dark current. Usually, the voltage on a power storage device installed in a vehicle is 13 V, and the voltage maintained by the diode 31 is 0.6 V with almost no dependency on dark current. Accordingly, the voltage of the path (referred to as a "dark current path" below) from the first power storage device 11 to the second load 22 through the bypass 33 is 13−10−0.6=2.4 V.

Envision the case where a value twice that of normal dark current is allowed. Dark current is usually around 10 mA with an upper limit value of 20 mA. Thus, the resistance value of the dark current path can be set to, or lower than, 2.4 [V]/20 [mA]=120 [Ω], and up to 20 mA of dark current can flow therethrough.

It can be estimated that the internal resistance value of the first power storage device 11 is 10 mΩ, and 5 mΩ is the sum of the resistance value of the wiring between the first power storage device 11 and the first terminal 3a and the resistance value of the wiring between the second terminal 3b and the second load 22. Accordingly, in consideration of the sum thereof (0.015Ω), the upper limit of the resistance value of the resistor 32 is roughly 120Ω.

Now, consider voltage drop in the resistor 32 and the tolerance to the grounding current in the case where the dark current is 10 mA and the resistance value of the resistor 32 is 100Ω (<120Ω). The voltage drop of the resistor 32 is calculated as 10 [mA]×100 [Ω]=1 [V]. The voltage supported by the diode 31 is 0.6 V and the voltage of the first power storage device 11 is 13 V, and therefore a voltage of 13−1−0.6=11.4 [V] is applied to the second load 22, and it can be understood that 10 V or more of voltage can be applied.

If we assume that a ground fault has occurred in the second load 22, then the voltage applied to the resistor 32 is 13−0.6=12.4 [V], and the current (grounding current) that flows through the resistor 32 is calculated as 12.4 [V]/100 [Ω]=124 [mA]. In this case, the power that is consumed by the resistor 32 is 100 [Ω]×124 [mA]×124 [mA]≈1.54 [W]. Accordingly, a resistor that has a rated power of several W can be selected as the resistor 32.

Note that the configurations that have been described in the foregoing embodiment and example of execution can be combined as appropriate as long as no contradictions arise.

Although the present disclosure has been described in detail above, the foregoing description is to be considered in all respects as illustrative, and the present disclosure is not limited to the given examples. It is to be understood that innumerable modifications that are not described herein can be envisaged without departing from the scope of the present disclosure.

The invention claimed is:

1. A power supply box comprising:
a first terminal that is connected to a first power storage device that supplies power to a first in-vehicle load;
a second terminal that is connected to an alternator and a second in-vehicle load;
a normally-off switch that is having a first end directly connected to the first terminal and a second end directly connected to the second terminal so as to be interposed between the first terminal and the second terminal;
a battery fuse terminal having a pair of fuses connected in series with each other, one of the pair of fuses is interposed between the first power storage device and the first terminal and the other of the pair of fuses is interposed between the first power storage device and the first in-vehicle load;
and
a bypass having a first end and a second end, the bypass is connected in parallel with the switch the first end of the bypass directly connected to the first terminal and the second end of the bypass directly connected to the second terminal, wherein the bypass includes a diode and a resistor, the diode has a forward direction that is from the first terminal toward the second terminal, and wherein the resistor is connected in series with the diode between the first terminal and the second terminal and interposed between the first terminal and the diode, the resistor having a resistance value that is larger than a resistance value of the switch when the switch is turned on.

2. The power supply box according to claim 1, wherein a resistance value of the resistor is larger than an on-resistance-value of the switch.

3. The power supply box according to claim 1, wherein a resistance value of the resistor is 120Ω or less.

4. The power supply box according to claim 2, wherein a resistance value of the resistor is 120Ω or less.

* * * * *